US012045378B2

(12) United States Patent
Albesa et al.

(10) Patent No.: US 12,045,378 B2
(45) Date of Patent: Jul. 23, 2024

(54) SECURED STORAGE OF CIPHERING KEYS (71) Applicants: STMicroelectronics (Alps) SAS, Grenoble (FR); STMicroelectronics (Grand Ouest) SAS, Le Mans (FR)

(72) Inventors: Franck Albesa, Parigne l'eveque (FR); Nicolas Anquet, Grenoble (FR)

(73) Assignees: STMicroelectronics (Grand Ouest) SAS, Le Mans (FR); STMicroelectronics (Alps) SAS, Grenoble (FR)

( * ) Notice: Subject to any disclaimer, the term of this patent is extended or adjusted under 35 U.S.C. 154(b) by 238 days.

(21) Appl. No.: 17/657,212

(22) Filed: Mar. 30, 2022

(65) Prior Publication Data
US 2022/0318439 A1 Oct. 6, 2022

(30) Foreign Application Priority Data

Mar. 31, 2021 (FR) .................................... 2103316

(51) Int. Cl.
*G06F 21/79* (2013.01)
*G06F 21/60* (2013.01)
*H04L 9/08* (2006.01)
*H04L 9/14* (2006.01)

(52) U.S. Cl.
CPC ............ *G06F 21/79* (2013.01); *G06F 21/602* (2013.01); *H04L 9/0894* (2013.01); *H04L 9/14* (2013.01)

(58) Field of Classification Search
CPC ...... G06F 21/79; G06F 21/602; G06F 21/575; H04L 9/0894; H04L 9/14; H04L 2209/12; H04L 9/088
See application file for complete search history.

(56) References Cited

U.S. PATENT DOCUMENTS

| 9,064,135 | B1 | 6/2015 | Poo et al. | |
|---|---|---|---|---|
| 2011/0038479 | A1* | 2/2011 | Bilodi | H04L 9/0894 380/45 |
| 2014/0310535 | A1 | 10/2014 | Sibert | |
| 2016/0283937 | A1* | 9/2016 | Reese | G06Q 20/4012 |
| 2016/0364343 | A1* | 12/2016 | Case | G06F 12/145 |
| 2019/0089529 | A1 | 3/2019 | Conway | |
| 2019/0334882 | A1* | 10/2019 | Mondello | H04L 9/0869 |
| 2019/0372780 | A1 | 12/2019 | Messerges | |
| 2021/0044972 | A1 | 2/2021 | Murray | |
| 2021/0357526 | A1 | 11/2021 | Yekhanin | |

(Continued)

OTHER PUBLICATIONS

Welter, Oliver, "Data Protection and Risk Management on Personal Computer Systems Using the Trusted Platform Module," Jan. 1, 2018, Technical University of Munich Chair tor data processing, 109 pages.

(Continued)

*Primary Examiner* — Henry Tsang
(74) *Attorney, Agent, or Firm* — Slater Matsil, LLP (57) ABSTRACT

The present disclosure relates to a method for performing a cryptographic operation, the method including generating a first count value by a monotonic counter of a processing device, transmitting the first count value from the monotonic counter to a memory of the processing device, selecting a first encryption key from the memory based on the first count value, and providing the selected first encryption key to a cryptographic processor.

20 Claims, 8 Drawing Sheets

(56) References Cited

U.S. PATENT DOCUMENTS

2022/0131848 A1  4/2022 Shiner

OTHER PUBLICATIONS

Ball, Matthew V., et al., "The XTS-AES Tweakable Block Cipher An Extract from IEEE STD 1619-2007," published Apr. 18, 2008, 24 pages.

Sarmenta, Luis F. G et al., "Virtual Monotonic Counters and Count-Limited Objects using a TPM without a Trusted OS," ST06, Proceedings of the first ACM Workshop on Scalable trusted computing, Nov. 3, 2006, Alexandria, Virginia, 15 pages.

* cited by examiner

SECURED STORAGE OF CIPHERING KEYS

CROSS-REFERENCE TO RELATED APPLICATIONS

This application claims priority to French Application No. 2103316, filed on Mar. 31, 2021, which application is hereby incorporated herein by reference in its entirety.

TECHNICAL FIELD

The present disclosure relates to the field of methods and devices for electronic circuit security, and in particular to a device and method for securely using encryption keys.

BACKGROUND

Some processing devices comprise cryptographic processors requiring the use of encryption keys that are not accessible from outside the device.

For example, a processing device is operated by executing codes, stored in a non-volatile memory of the device, used in the life of the circuit. For security reasons, some codes are stored in encrypted form, and encryption keys can be loaded to decrypt these codes.

SUMMARY

There is a recurring need to improve the security of storing such encryption keys.

Embodiments herein at least partially address all or some of the drawbacks of known storage methods and devices.

One embodiment provides a method for performing a cryptographic operation, the method comprising: generating a first count value by a monotonic counter of a processing device, transmitting the first count value from the monotonic counter to a memory of the processing device, selecting a first encryption key from the memory based on the first count value; and providing the selected first encryption key to a cryptographic processor.

According to one embodiment, selecting the first encryption key is performed by a selection circuit configured to prevent access to one or more other encryption keys stored in the memory in association with other count values of the monotonic counter.

According to one embodiment, the first encryption key is further selected by a first index.

According to one embodiment, the method further includes: generating a second count value by the monotonic counter of the processing device; transmitting the second count value from the monotonic counter to the memory of the processing device; selecting a second encryption key from the memory based on the second count value and the first index; and providing the selected second encryption key to the cryptographic processor.

According to one embodiment, the memory is configured such that access to the first encryption key is not permitted based on a count value greater than the first count value.

According to one embodiment, the provision of the first encryption key to the cryptographic processor is performed, based on a storage condition of the first encryption key. The cryptographic processor may perform the provision via a bus between the memory and the cryptographic processor. The cryptographic processor may also perform the provision via a register readable by a processor of the processing device.

According to one embodiment, the storage condition is that the first encryption key is stored in a first address range.

According to one embodiment, the storage condition is that the first encryption key is stored in the memory in association with a first value.

According to one embodiment, the bus is a bus dedicated to the transmission of encryption keys between the memory and the cryptographic processor.

According to one embodiment, the method further includes: selecting a third encryption key from the memory based on the first count value and a second index; and providing the selected third encryption key to the cryptographic processor.

According to one embodiment, the monotonic counter is initialized to the first count value upon a first boot of the processing device, the method further comprising, initializing the monotonic counter to the second count value upon a second boot of the processing device.

According to one embodiment, the method comprises another boot of the processing device during which the monotonic counter is initialized to the first count value if a device state condition is satisfied.

According to one embodiment, the device state condition corresponds to the programming state of an area of the memory.

One embodiment provides a data processing device including: a monotonic counter configured to generate a first count value; and a memory comprising a selection circuit, the selection circuit being configured to select a first encryption key stored in the memory based on the first count value, and provide the selected first encryption key to a cryptographic processor.

BRIEF DESCRIPTION OF THE DRAWINGS

The foregoing features and advantages, as well as others, will be described in detail in the following description of specific embodiments given by way of illustration and not limitation with reference to the accompanying drawings, in which.

DETAILED DESCRIPTION OF ILLUSTRATIVE EMBODIMENTS

Like features have been designated by like references in the various figures. In particular, the structural and/or functional features that are common among the various embodiments may have the same references and may dispose identical structural, dimensional, and material properties.

For the sake of clarity, only the operations and elements that are useful for an understanding of the embodiments described herein have been illustrated and described in detail. In particular, the design of processing devices is well known to the person skilled in the art and certain components have not been described in the following.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Figure 1:
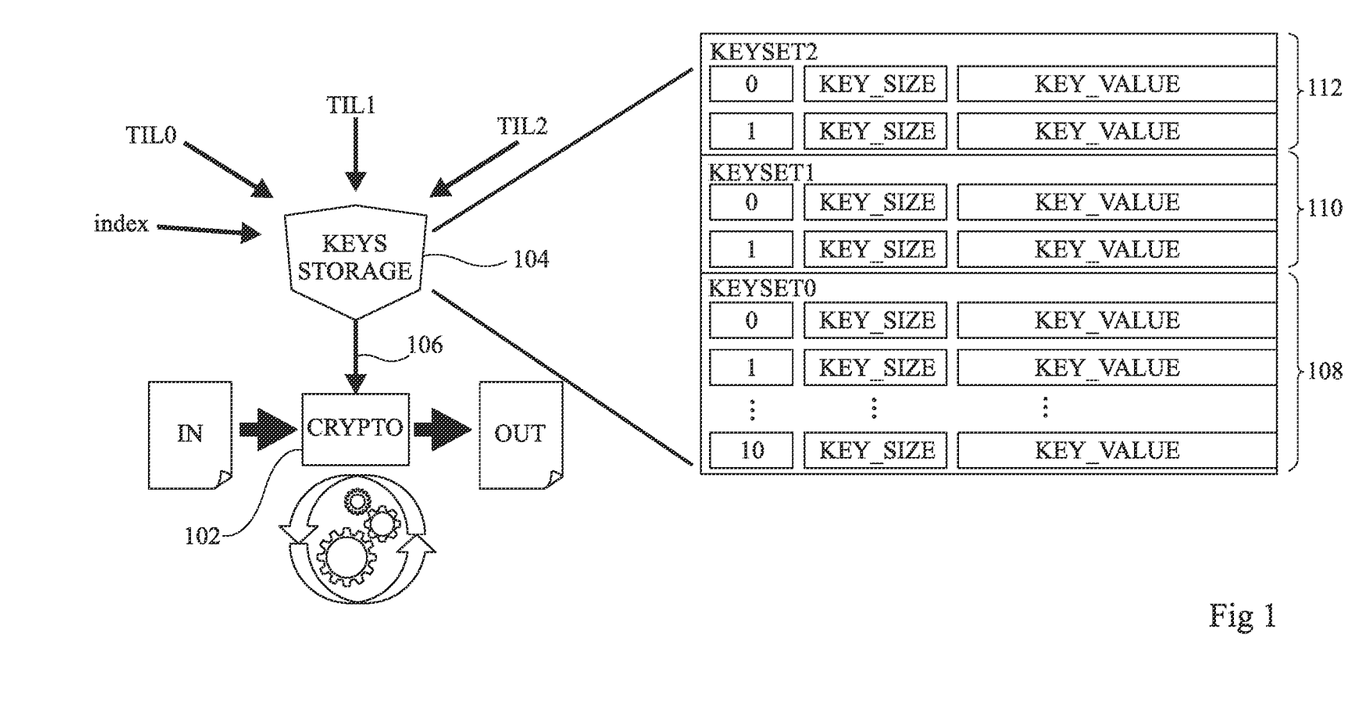
FIG. 1 represents, in a very schematic way, a method for decrypting data on the basis of encryption keys according to one embodiment of the present description.

FIG. 1 represents, very schematically, a method for decrypting data based on encryption keys according to one embodiment of the present description.

Input data (IN), comprising for example, encrypted codes, is provided to a cryptographic processor 102 (CRYPTO) of a processing device (not illustrated in FIG. 1). For example, a general-purpose processor (also not illustrated in FIG. 1) of the processing device instructs the execution of a code, such as a boot code. The cryptographic processor 102 is configured to decrypt the input data using encryption keys, and to provide, at an output of the cryptographic processor 102, decrypted data (OUT).

The encryption keys are stored in a non-volatile memory 104 (KEY STORAGE), each key being stored, for example, in association with a temporal isolation level (TIL). For example, the memory 104 stores multiple sets of keys, and each set of keys is associated with a corresponding isolation level. A TIL value is provided to the memory 104 and allows, for example, one or more keys to be selected from the set of keys associated with the isolation level corresponding to the TIL value. In certain cases, the memory 104 is further provided with an index value allowing the selection of a given key from each set of keys.

The TIL value corresponds to a count value generated by a monotonic counter (not illustrated in FIG. 1) and the keys associated with a TIL value are, for example, only accessible when the count value generated by the monotonic counter is equal to the TIL value.

An example of the contents of the memory 104 is illustrated in the right hand part of FIG. 1. In this example, the non-volatile memory 104 comprises a first area 108 (KEYSET0) in which a first set of keys is stored. The memory further comprises a second area 110 (KEYSET1), in which a second set of keys is stored, as well as a third area 112 (KEYSET2) in which a third set of keys is stored. The first, second, and third sets of keys are, for example, associated with three different isolation levels. The first set of keys is, for example, associated with the isolation level TIL 0, the second set of keys with the isolation level TIL 1, and the third set of keys with the isolation level TIL 2.

In the memory 104, each key is, for example, represented by a key value (KEY_VALUE), and is associated with an index value as well as a size value (KEY_SIZE) indicating, for example, the length in bits of the key.

In the example illustrated on the right hand side of FIG. 1, the area 108 contains eleven encryption keys associated with isolation level TIL0. These keys are also each identified by an index ranging from 0 to 10. The area 110 contains two encryption keys associated with isolation level TIL1 and identified by indexes 0 and 1. The area 112 contains two encryption keys associated with isolation level TIL2 and identified by indexes 0 and 1. Thus, for certain index values (the values 0 and 1 in this example), the selected key depends on the TIL value. The list of keys illustrated in FIG. 1 is just one example, and in other embodiments, there could be another number of sets of keys and another number of keys in each set. Furthermore, some fields associated with each key, such as the index and/or size value, could be omitted.

When selecting a key from the memory 104 for decryption of at least one encrypted input data, a count value corresponding to an isolation level (TIL0, TIL1, or TIL2) is transmitted to the memory 104, as well as the index (index) of the desired key. The key corresponding to that isolation level and that index is then transmitted to the cryptographic processor 102, for example via a bus 106. In some implementations, the bus 106 may be a dedicated bus. The bus 106 connects, for example, exclusively the memory 104 to the cryptographic processor 102.

Figure 2A:
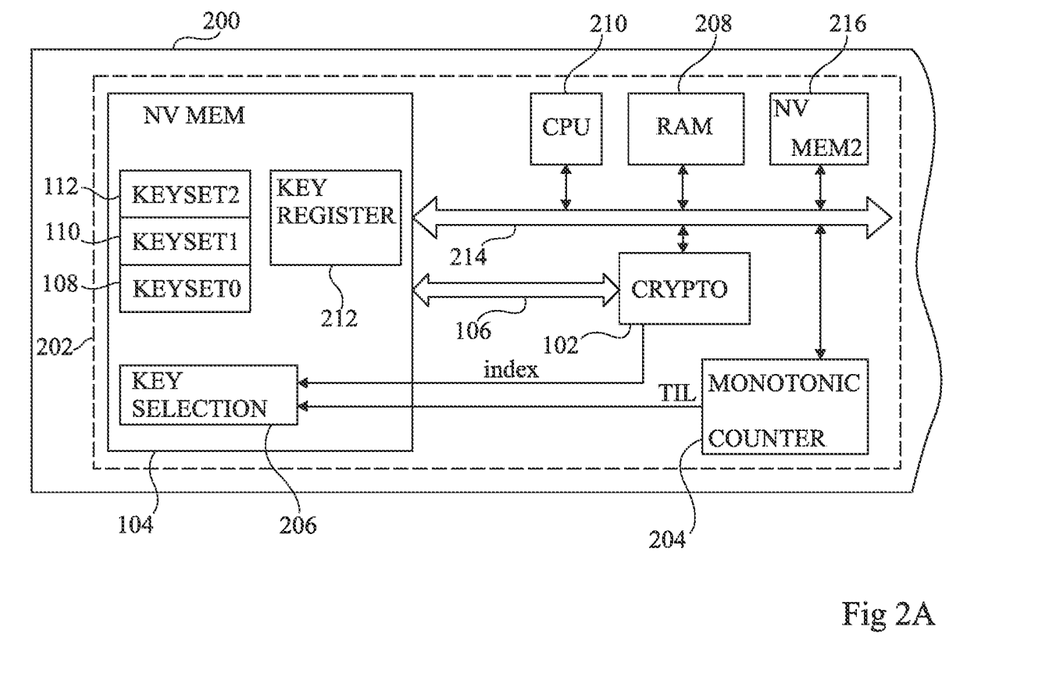
FIG. 2A represents, very schematically and in block form, an electronic device according to one embodiment of the present description.

FIG. 2A represents, very schematically and in block form, one embodiment of an electronic device 200 including a processing device 202.

The electronic device 200 is, for example, an electronic card such as a microcircuit card, computer hardware, a microprocessor circuit, etc.

The processing device 202 comprises, for example, the cryptographic processor 102 (CRYPTO) and the non-volatile memory 104 (NV MEM) described above in connection with FIG. 1. This memory 104 is, for example, implemented by a flash memory, although other types of non-volatile memory could be used. The memory 104 comprises, for example, the first, second and third areas 108, 110 and 112 (KEYSET0, KEYSET1 and KEYSET2) described relative to FIG. 1. The memory 104 also comprises, for example, a selection circuit 206 (KEY SELECTION). This selection circuit 206 (e.g. a selection interface) is coupled to the output of a monotonic counter 204 (MONOTONIC COUNTER) and receives the TIL value of that counter. The selection circuit 206 is, for example, further coupled to an output of the cryptographic processor 102 and receives the index value from that output. For example, the index value is stored in a register (not illustrated) contained in the cryptographic processor 102, although this register could be elsewhere in the device 202.

Monotonic counters are known in the state of the art, with an example of such a counter described in "Virtual Monotonic Counters and Count-Limited Objects using a TPM without a Trusted OS" by L. F. G. Sarmenta, M. Van Dijk, C. W. O'Donnell, J. Rhodes and S. Devadas, for example in part 3, the document being incorporated herein by reference in its entirety. This document describes embodiments of a counter implemented in hardware and/or software form. For example, the monotonic counter 204 is implemented in hardware form by a digital circuit, such as an Application Specific Integrated Circuit (ASIC). The monotonic counter is configured to maintain a count value, accessible at an output of the counter. Following an increment instruction, the monotonic counter increases its count value by one or more units but, following each increment, the operation is not reversible. Indeed, the monotonic counter is configured so that its count value never decreases. Moreover, between two increments, the count value is, for example, protected against any modification, so that it cannot be erased or changed. Only the increment instruction allows the current value to be replaced by a new value that is higher than the current value.

The monotonic counter 204 is configured so that no instruction, other than a reset to zero of the processing device, allows the return to the previous value once the increment instruction is implemented. In the event that the count value is stored in a volatile manner, each time the processing device is turned off, the count value is lost and each time the device is rebooted, the monotonic counter generates an initial count value again. In the event that the count value is stored in a non-volatile storage element, upon each boot, an initial count value is, for example, rewritten to the non-volatile storage element of the monotonic counter.

The processing device 202 further comprises a non-secure general-purpose processor 210 (CPU, e.g. a central processing unit). For example, the general-purpose processor 210 is coupled via a bus 214 to the monotonic counter 204 as well as to a non-volatile memory (NV MEM2) 216 and the non-volatile memory 104. The memories 104 and 216 are, for example, of the flash type. In one example, the general-purpose processor 210 provisions the index value in the register (not shown) of the cryptographic processor 102, from where it is transmitted to the selection circuit 206.

The general-purpose processor 210 is further coupled via the bus 214 to the cryptographic processor 102 as well as to a RAM (random access memory) 208.

The memory 104 comprises, in some cases, a register 212 (KEY REGISTER) accessible via the bus 214.

The cryptographic processor 102 is, for example, connected via a bus 106 to the memory 104. The bus 106, for example, is a dedicated bus connecting the cryptographic processor 102 only to the memory 104. In other words, in this example no components other than the processor 102 and the memory 104 are connected to the bus 106.

For example, the non-volatile memory 216 contains encrypted boot codes, and the encryption keys are, in turn, stored, in the memory 104. In certain cases, the TIL value is incremented during the boot step of the processing device, and the encryption keys allow the boot codes to be decrypted. For example, at each boot of the processing device, a TIL value is initialized by the monotonic counter 204 and is transmitted to the selection circuit of the memory 104. The cryptographic processor 102 transmits to the selection circuit 206 the index values of one or more first encryption keys associated with one or more first encrypted boot codes associated with the initial TIL value. The first keys are transmitted to the cryptographic processor 102 via the bus 106 or are stored in the register 212 and transmitted to the cryptographic processor 102 via the bus 214. The first encrypted boot codes are also transmitted to the cryptographic processor 102 via the bus 214. The decrypted boot codes are then sent to the general-purpose processor 210 via the bus 214. In one example, the processor 210 executes the decrypted boot codes and instructs the monotonic counter to be incremented, which generates a new count value, greater than the original count value. Other encrypted boot codes associated with the next TIL values may be decrypted and executed in the same manner as the first codes described above.

Figure 2B:
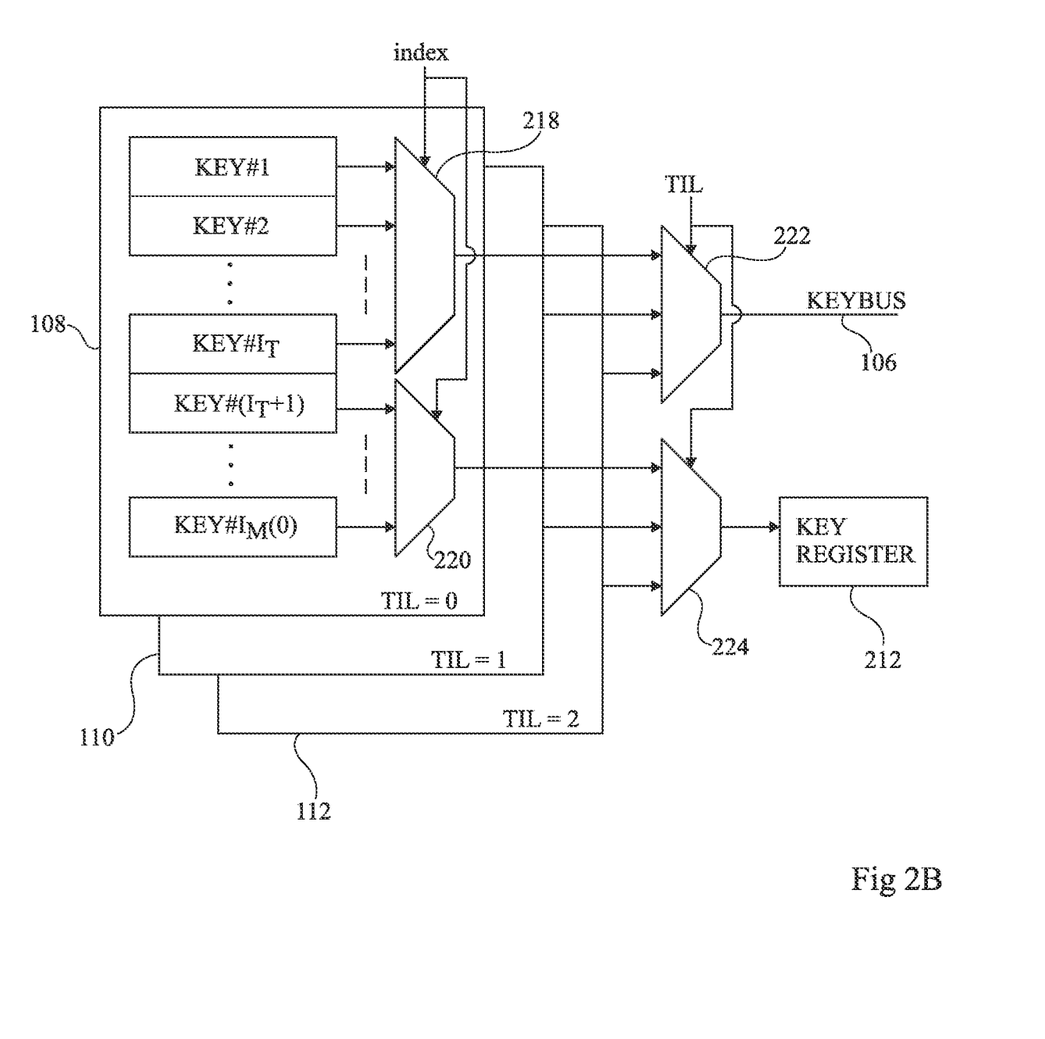
FIG. 2B schematically represents one embodiment of a memory for storing keys in a secure manner.

FIG. 2B represents an example embodiment of the memory 104 and in particular the selection circuit 206.

In the example illustrated in FIG. 2B, the first area 108 contains a first set of $I_M(0)$ encryption keys associated with the isolation level TIL 0. Each key is identified by an index value ranging from 1 to $I_M(0)$. The selection circuit 206 comprises, for example, two multiplexers 218 and 220, allowing the selection of a key based on the index value. Each of these multiplexers 218, 220 thus receives, as a control input, the index value transmitted by, for example, the cryptographic processor 102. The multiplexer 218 is configured to direct the keys to the bus (KEYBUS) 106, while the multiplexer 220 is configured to direct the keys to the register (KEY REGISTER) 212. In the example of FIG. 2B, a subset of keys, which are identified by index values ranging from 0 to a value $I_T$ are provided to the data inputs of the multiplexer 218, and a subset of keys, identified by index values ranging from $I_T+1$ to $I_M(0)$ in the example of FIG. 2B, are provided to the data inputs of the multiplexer 220.

The second area 110 contains a second set of $I_M(1)$ encryption keys (not represented in FIG. 2B) associated with the isolation level TIL 1. Similarly, the third area 112 contains a third set of $I_M(2)$ encryption keys (not represented in FIG. 2B) associated with the isolation level TIL 2. The selection circuit 206 further comprises, for example, for each area 110 and 112, two multiplexers (not represented in FIG. 2B), similar in operation to the multiplexers 218 and 220, for directing the corresponding keys from each area 110, 112.

The selection circuit 206 comprises, for example, two additional multiplexers 222 and 224, which are common to all areas 108, 110, 112, and allow selection of a key based on the TIL value. Each of these multiplexers 222, 224 thus receives, as a control input, the TIL value transmitted by the monotonic counter 204. The multiplexer 222 comprises, for example, data inputs coupled respectively to the outputs of the multiplexers 218 of each area 108, 110, 112, and the multiplexer 224 comprises, for example, data inputs coupled respectively to the outputs of the multiplexers 220 of each area 108, 110, 112. Each multiplexer 222, 224 thus comprises a number of data inputs equal to the number of memory areas, equal to three in the example in FIG. 2B. The multiplexers 222 and 224 prevent access to the keys associated with a non-active TIL value. In addition, the multiplexer 222 is configured to direct keys towards the bus 106, while the multiplexer 224 is configured to direct the keys towards the register 212.

In one example, the $I_T$ value is different in each area 108, 110 and 112. In another example, the $I_T$ value is a fixed value.

Other embodiments of the memory 104 are possible. For example, instead of providing both multiplexers 218 and 220, a single multiplexer may be used to select a key based on the index, and the keys in each area are further associated with flags indicating whether they are transmitted via the bus 106 or stored in the register 212. For example, a demultiplexer is provided to direct selected keys either to the bus 106 or to the register 212, based on the flag.

Figure 3:
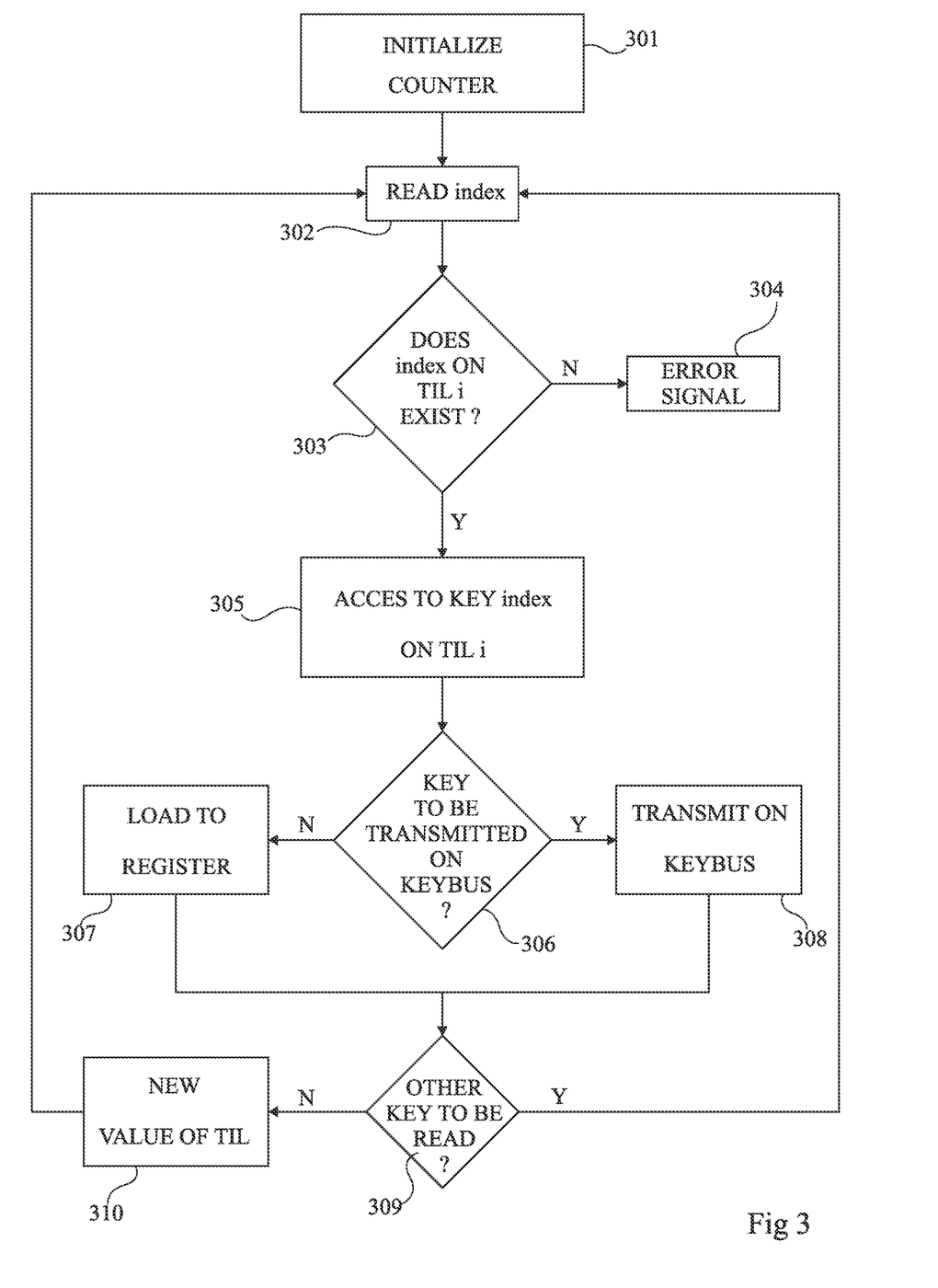
FIG. 3 illustrates a flowchart representing the operations of a method for selecting keys and transmitting these keys to a cryptographic processor, according to an example of one embodiment of the present description.

FIG. 3 is a flowchart representing the operations of a method for transmitting keys to a cryptographic processor according to an example of one embodiment of the present description. This method is implemented by, for example, the cryptographic processor 102 and the selection circuit 206 of the memory 104.

In a step 301 (INITIALIZE COUNTER), the monotonic counter is initialized to an initial value, being a natural number. In the example in which the count value is stored in a volatile manner, each boot of the processing device causes the count value to be initialized, for example to 0. In another example in which the count value is stored in non-volatile storage elements, each boot of the processing device causes the current count value to be replaced with a new initial count value, for example 0. For example, the step 301 occurs following a boot of the processing device 202.

In some embodiments, the initial count value generated following a boot may vary according to the context of the processing device. For example, one or more count values correspond to isolation levels reserved for the manufacturer of the device 202, and a boot by an intermediate entity between the manufacturer and the end user and/or by the end user will trigger a count value higher than these reserved count values. For example, if the count value 0 is reserved for the manufacturer, a boot by an intermediate entity between the manufacturer and the end user and/or by the end user will trigger a count value equal to 1 and the boot code(s) as well as sensitive data associated with isolation level 0 will be inaccessible. For example, once manufacture is complete, one or more bits stored in a non-volatile memory 104, or in another memory, are programmed to ensure that the count value is initialized to 1. In one example, these bits correspond to a signature-protected value indicating the initial count value to be applied. For example, the signature is generated based on an encryption key, and may for example correspond to a MAC (Message Authentication Code) signature. This value is, for example, supplied to the monotonic counter 204 via the bus 214. It is then possible, by changing the signature-protected value, to restart the monotonic counter 204 back at 0 (or at another value) during the life of the device.

In a step 302 (READ index), the index value for example stored in the cryptographic processor register 102 is read and transmitted to the selection circuit 206. In a step 303 (DOES index ON TIL i EXIST?) the selection circuit 206 verifies that an encrypted key stored in memory 104 in association with the TIL value and identified by the index value does exist. If this is not the case (N branch), the method terminates in a step 304 (ERROR SIGNAL) in which the device notifies the user that an error has occurred, for example by means of an audible signal, or by displaying a text message.

In the event that an encrypted key associated with the current TIL value and identified by the index value does exist (Y branch), the method continues in a step 305 (ACCESS TO KEY index ON TIL i), subsequent to step 303. In step 305, the key identified by the index value and associated with TIL i is selected. For example, the selection is made by the circuit described relative to FIG. 2B.

In a step 306 (KEY TO BE TRANSMITTED ON KEY-BUS?), it is determined whether the selected key is to be transmitted to the cryptographic processor 102 via the bus 106. For example, the step 306 follows the selection according to the index value made by the circuit described relative to FIG. 2B, with indexes 1 to $I_T$ of the area 108 being reserved for transmission via bus 106, and indexes $I_T+1$ to $I_M$ (0) being reserved for storage in the register 212. In another example, the decision is made based on a flag or according to any other means to indicate to which component (the bus 106 or the register 212) the selected key should be sent.

If the selected key is to be transmitted via the bus 106 (Y branch) the method continues in a step 308 (TRANSMIT ON KEYBUS) in which the key is sent to the cryptographic processor via the bus 106. Otherwise (N branch at the output of step 306), the method continues in a step 307 (LOAD TO REGISTER) in which the selected key is stored in the register 212. Once stored in the register 212, the selected key is accessible by the cryptographic processor via bus 214.

In a step 309 (OTHER KEY TO BE READ?) following step 307 or step 308, it is checked, for example by the general-purpose processor 210 or the selection circuit 206, whether other encrypted encryption keys associated with the current TIL value are to be transmitted to the cryptographic processor. If this is the case (Y branch), a new index value is stored in the cryptographic processor register and the method resumes at step 302. If all encrypted keys associated with the current TIL value have been decrypted (N branch), a new TIL value is generated by incrementing the monotonic counter in a step 310 (NEW VALUE OF TIL). For example, the TIL value is incremented by an instruction in the operating codes executed by the general-purpose processor 210. When a new TIL value is transmitted by the monotonic counter 204 towards the selection circuit 206, the method resumes at step 302.

Figure 4:
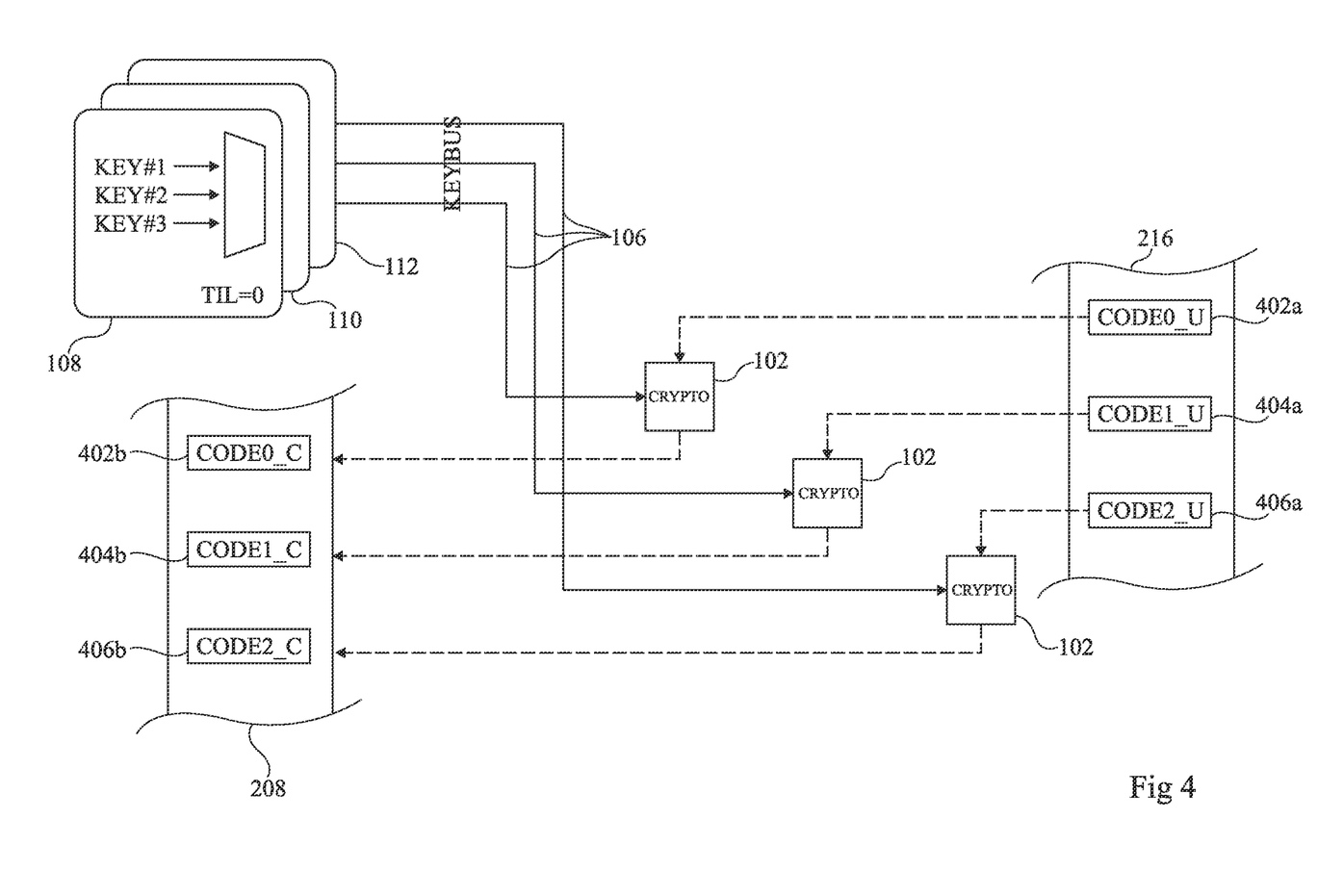
FIG. 4 illustrates a system for decrypting encrypted data stored in a memory according to an example of one embodiment of the present description.

FIG. 4 illustrates a system for decrypting encrypted data according to one embodiment of the present description. For example, the encrypted data is stored in the non-volatile memory 216 of the processing device 202, and the decrypted data is stored in the memory 208, even though it is possible that the encrypted data and/or decrypted data may be stored in another memory.

In the example illustrated in FIG. 4, the non-volatile memory 216 comprises three encrypted codes, for example the boot codes. For example, the monotonic counter is initialized to the value TIL 0, and this TIL value is transmitted to the selection circuit 206. The general-purpose processor 210 instructs, for example, the decryption for execution of a first encrypted code 402a (CODE0_U). The TIL value with which the set of decryption keys of the first encrypted code 402a is associated, is, for example, the value 0. The first encrypted code 402a is sent to the cryptographic processor 102, via the bus 214 under the control of the general-purpose processor 210, as indicated by a dotted arrow in FIG. 4. During decryption of the first encrypted code 402a, the cryptographic processor 102 transmits, for example, the index values of the encryption keys (of keys KEY #1, KEY #2, and KEY #3 in the example of FIG. 4) associated with the value TIL 0 to the selection circuit 206 according to the rhythm of the decryption operation. These keys from memory area 108 of memory 104 are then transmitted through the selection circuit 206 to the cryptographic processor 102 via the bus 106. The cryptographic processor 102 decrypts the first encrypted code 402a and outputs a first decrypted code 402b (CODE0_C), which it stores, for example via bus 214, in the RAM memory 208. In one example, the decrypted code 402b comprises, or concludes with, a monotonic counter increment instruction. The general-purpose processor 210 therefore instructs the count value to be incremented upon execution of this instruction, and the monotonic counter 204 transmits a new TIL value, such as 1, to the selection circuit 206.

For example, the general-purpose processor 210 instructs the decryption of a second encrypted code 404a (CODE1_U), for example a boot code. As with the first encrypted code 402a, the second encrypted code 404a is transmitted to the cryptographic processor 102, for example via the bus 214, and the decryption operation proceeds in a similar manner as for the encrypted code 402a, based on the keys stored in the area 110 of the memory 104. The cryptographic processor 102 decrypts the second encrypted code 404a and outputs a second decrypted code 404b (CODE1_C), which it stores, for example via the bus 214, in the RAM memory 208. In one example, the decrypted code 404b comprises, or concludes with, an instruction to increment the monotonic counter 204. The general-purpose processor 210 therefore instructs the count value to be incremented upon execution of this instruction, and the monotonic counter 204 transmits a new TIL value, for example 2, to the selection circuit 206.

For example, the general-purpose processor 210 instructs the decryption of a third encrypted code 406a (CODE2_U), for example a boot code. As with the first and second encrypted codes 402a and 404a, the third encrypted code 406a is transmitted to the cryptographic processor 102, for example via the bus 214, and the decryption operation proceeds in a similar manner as for the encrypted code 402a, based on the keys stored in the area 112 of the memory 104. The cryptographic processor 102 provides a third decrypted code 406b (CODE2_C) and stores it in the RAM 208. In one example, the decrypted code 406b comprises, or concludes with, an instruction to increment the monotonic counter 204. The general-purpose processor 210 therefore instructs the count value to be incremented upon execution of this instruction. The monotonic counter 204 transmits the new TIL value, for example 3, to the select selection circuit 206. Since this value does not correspond to any decryption key in the memory 104, the selection circuit 206 then prevents any access to the keys stored in the memory 104.

Figure 5:
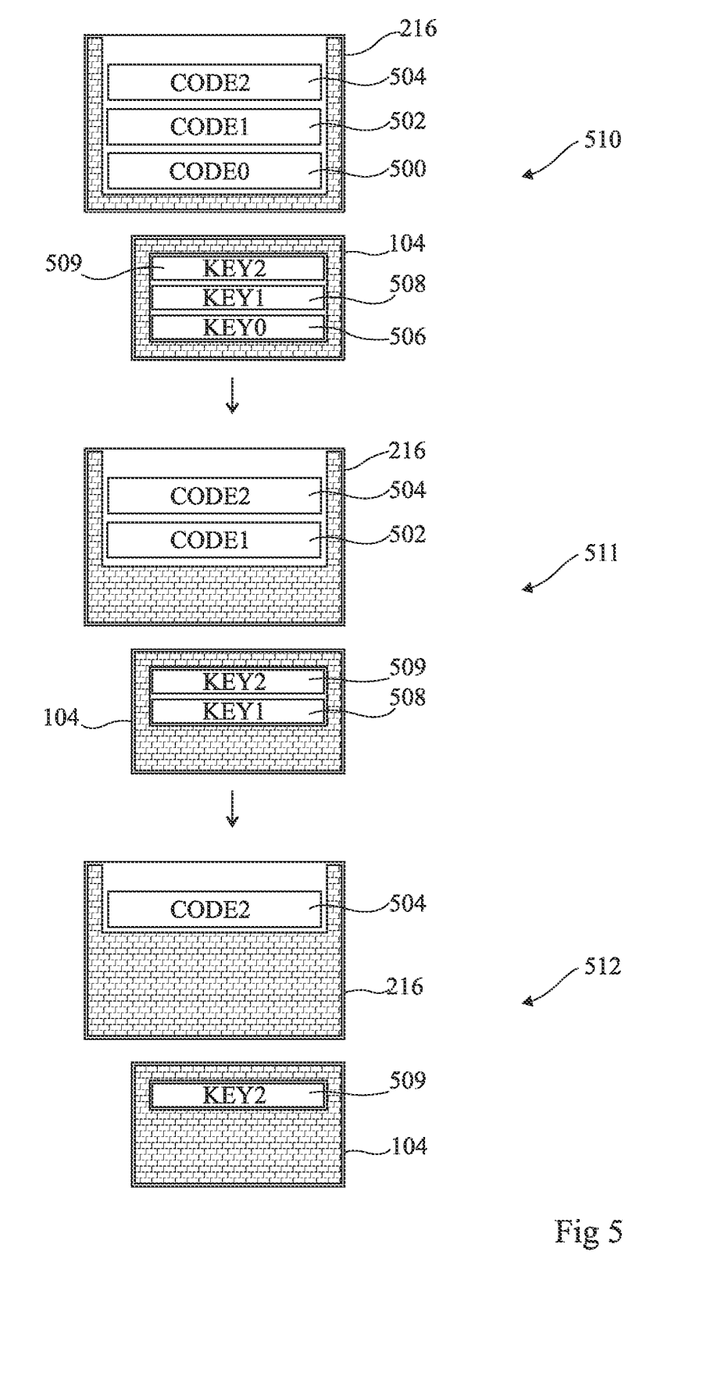
FIG. 5 represents data and codes accessible during a secure boot according to one embodiment of the present description.
Figure 6:
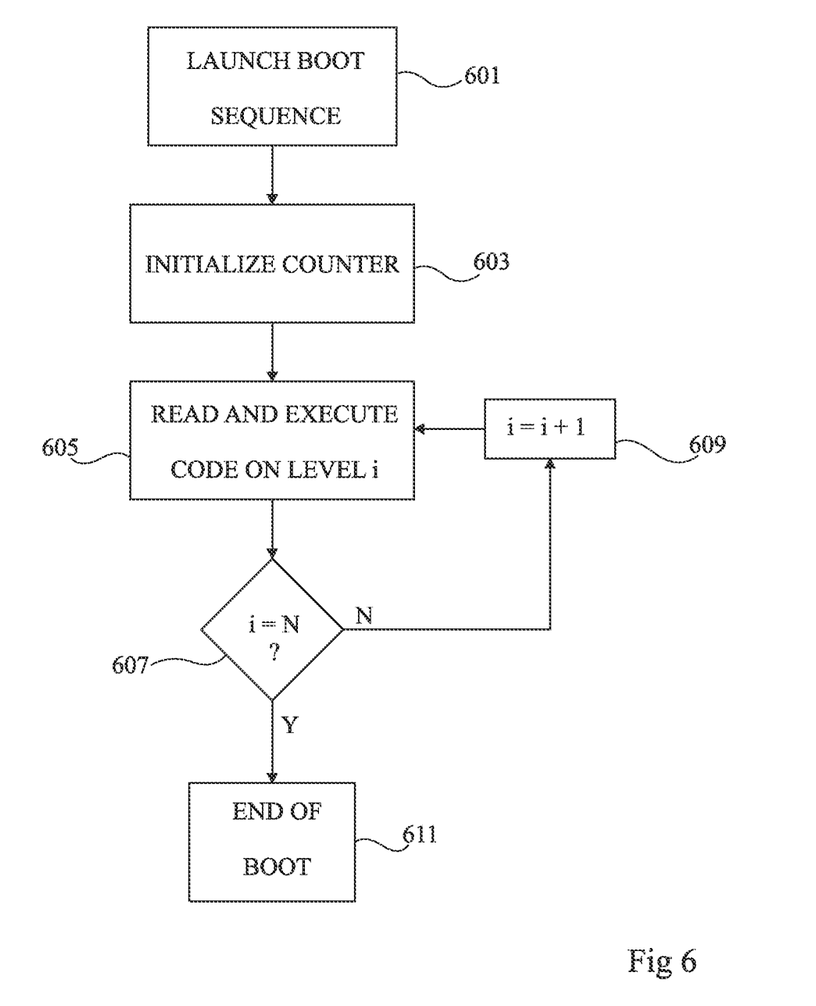
FIG. 6 illustrates a flowchart representing operations of a secure boot of a processing device according to an embodiment of the present description.
Figure 7:
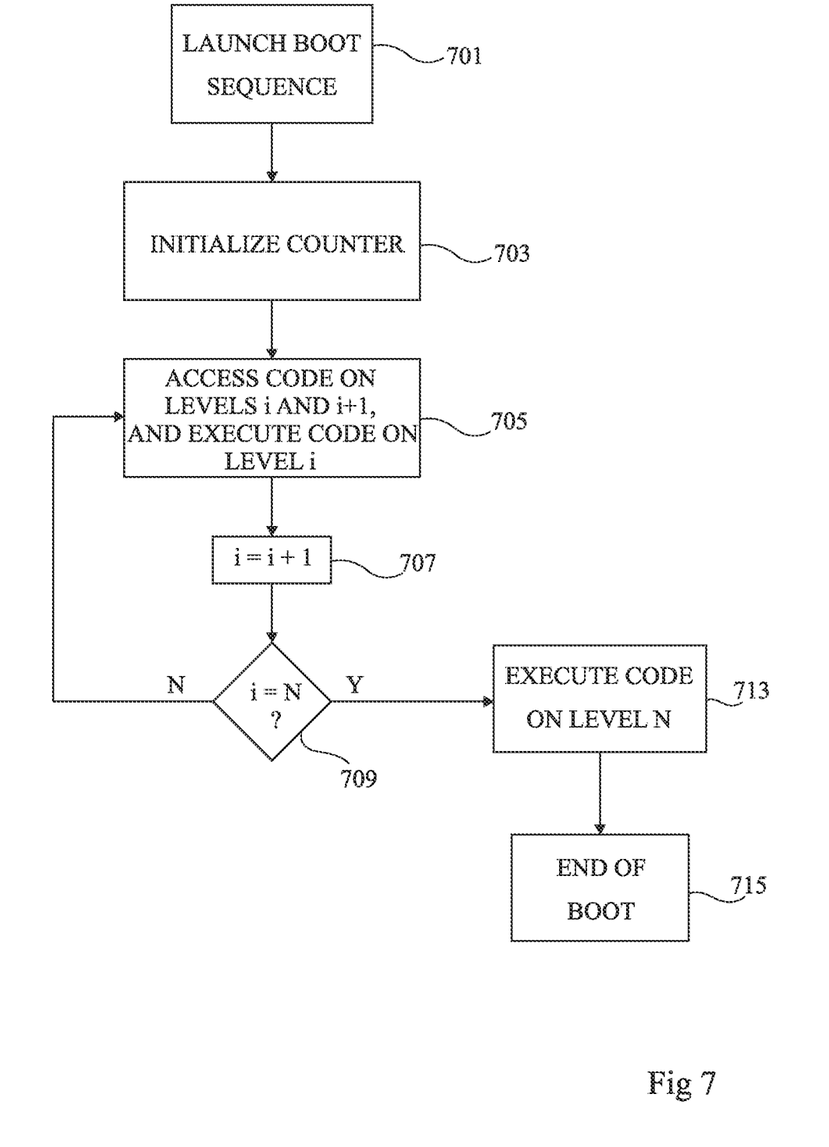
FIG. 7 illustrates a flowchart representing operations of a secure boot of a processing device according to another embodiment of the present description.

FIGS. 5 to 7 illustrate one embodiment of the present description in which the encrypted data are boot codes and/or encryption keys associated with those codes, and the TIL value is incremented at the end of each step of the boot sequence. Each TIL value further corresponds to one or more boot codes associated with each boot step; these codes are rendered inaccessible when the current TIL value is greater than their associated TIL value.

In the example of FIG. 5, memory areas 506, 508, and 509 store sensitive data associated respectively with boot codes 500, 502, and 504 stored in the non-volatile memory 216. The areas 506, 508, and 509 are, for example, separate from the areas 500, 502, and 504, but remain associated with an isolation level corresponding to that of the boot codes to which the data is associated. This sensitive data includes, for example, one or more encryption keys stored in each area 506, 508, and 509, and each of these areas is contained in the non-volatile memory 104. According to another embodiment, each area 506, 508 and 509 is a sub-area of the corresponding area 500, 502 and 504.

During a first step 510 of booting the processing device illustrated at the top of FIG. 5, the current count value is, for example, 0. In the example of FIG. 5, an isolation level 0 is associated with a first code (CODE0) as well as with first sensitive data (KEY0). A memory access control circuit 216 (not represented) and the selection circuit 206 are configured, for example, so that this first code and these first data are exclusively accessible when the current count value is equal to 0. However, during the step 510, the access control circuit and the selection circuit allow, for example, access to all memory areas 500, 502 and 504, as well as to all areas 506, 508 and 509. Indeed, in some cases, in order to anticipate, for example, subsequent steps in the boot process, one or more other boot codes (CODE1, CODE2) are accessible for reading during step 510.

For example, once the first code, CODE0, is executed, the general-purpose processor 210 instructs a first increment of the current count value by the monotonic counter 204. For example, the first code comprises an instruction requesting the counter increment. This instruction is, for example, transmitted to a control register (not shown) of the monotonic counter.

After this first increment, the current count value of the monotonic counter 204 is, for example, equal to 1, corresponding to a second boot step 511. The access control circuit as well as the selection circuit receive the new current count value, and are configured to prevent, on the basis of this count value greater than 0, any access to the first code as well as to the first data that are associated with isolation level 0. In other words, the memory areas 500 and 506 are locked on the basis of any count value strictly greater than 0.

The isolation level 1 is associated with a second code (CODE1) contained in the area 502 as well as with second data (KEY1) contained in the area 508. According to one embodiment, a third code (CODE2), for example associated with isolation level 2 and contained in area 504, is accessible for reading based on the current count value equal to 1.

For example, once the second code CODE1 is executed, the general-purpose processor 210 instructs a second increment of the current count value by the monotonic counter 204. For example, after this second increment, the current count value of the monotonic counter 204 is equal to 2, corresponding to a third boot step 512. The isolation level 2 is associated with the third code CODE2 as well as third data (KEY2). The access control circuit and the selection circuit 206 receive the new count value, and are configured to prevent, based on this count value greater than 1, any access to the first and second codes as well as the first and second data that are associated with isolation levels less than or equal to 1.

According to one embodiment, when the last boot code is executed, for example the third boot code, the general-purpose processor 210 instructs a third increment of the current count value by the monotonic counter. The access control circuit and the selection circuit 206 then lock out all access to the first, second, and third boot codes and the first, second, and third data.

According to another embodiment, when the last boot code is executed, for example the third boot code, the current count value is not incremented by the monotonic counter 204 and access to the third boot code as well as the third data remains allowed by the access control circuit.

FIG. 6 is a flowchart representing operations of a secure boot method of a processing device according to an example of one embodiment of the present description. This method is implemented by, for example, the general-purpose processor 210, the monotonic counter 204, and the access control circuit and the selection circuit 206 of the processing device of FIG. 2.

In a step 601 (LAUNCH BOOT SEQUENCE) the processing device 202 starts. In one example, this is the first boot of the device 202 after it is manufactured. In another example it is a boot performed by an intermediate entity between the manufacturer of the device 202 and its end user. In yet another example, it is a so-called operational boot of the electronic device 200 performed by the end user.

In a step 603 (INITIALIZE COUNTER), subsequent to step 601, the monotonic counter is initialized to an initial value, being a natural number. In the example in which the count value is stored in a volatile manner, each boot of the processing device causes the count value to be initialized, for example to 0 or to 1. In another example in which the count value is stored on non-volatile storage elements, each boot of the processing device causes the current count value to be replaced with the initial count value, for example equal to 0 or to 1.

In some embodiments, the initial count value generated following a boot may vary according to the state, or context, of the processing device 202. For example, one or more count values corresponding to one or more isolation levels reserved for an initial set-up phase of the device 102, comprising, for example, the installation of firmware. The data and/or codes associated with these isolation levels are, for example, used for this initial set-up.

For example, following manufacture, the processing device 202 has the context "blank" and the initial count value is equal to a value reserved for setting-up, such as 0. Once the set-up is complete, the context of the device becomes, for example, "set-up complete." With this new context, booting the device 102, for example by an intermediate entity between the manufacturer and the end user and/or by the end user, will then trigger a count value greater than the reserved count value, and for example equal to 1. The boot code(s), as well as the sensitive data, associated with the isolation level corresponding to the reserved count value will, therefore, be inaccessible.

For example, the context of the device is detected by the presence of a voltage on a boot pin of the device, this voltage being applied, for example, by adding a jumper between the boot pin and another pin at a supply voltage. Additionally or alternatively, the context of the device is detected by the value of one or more bits stored in a non-volatile, protected manner in memory 104, or in another memory.

In one example, the general-purpose processor 210 is arranged to detect the context of the device 102 upon booting the device 102, and to configure the initial count value of the monotonic counter 204 accordingly. In another example, the monotonic counter 204 is arranged to detect the context of the device 102, and to configure, itself its initial count value upon booting the device 102.

In a step 605 (READ AND EXECUTE CODE ON LEVEL i), subsequent to step 603, the data and boot codes associated with the isolation level i are read by the general-purpose processor 210 and the boot codes associated with the isolation level i are executed. Once the codes of isolation level i are executed, the general-purpose processor 210 compares, in a step 607 (i=N?) the count value i to the value N, where N is the count value associated with the last step in the boot sequence, i.e., the boot codes of the isolation level N are the last to be executed according to the embodiment of the present description. For example, in the example of FIG. 5, N is equal to 2. If i is not equal to N (N branch), the method continues in a step 609 (i=i+1) in which the general-purpose processor triggers the increment of the count value. For example, the count value increases from i to i+1. It is also possible that the increment increases the value i by several units. The method then resumes at step 605.

In the event that, as a result of the comparison step 607, the count value is equal to N (Y branch), the method concludes with step 611 (END OF BOOT) in which the boot of the processing device ends. According to one embodiment, the current count value remains equal to N following step 611. According to another embodiment, the count value is incremented in step 611, and the current count value becomes equal to N+1. In this second case, the access control circuit and the selection circuit are configured to prevent access to all boot codes based on this count value.

FIG. 7 is a flowchart representing operations of a secure boot method of a processing device according to another example embodiment of the present description. This method is implemented, for example, by the general-purpose processor 210, the monotonic counter 204, and the access control circuit and the selection circuit 206 of the processing device of FIG. 1.

Steps 701 and 703 are similar to steps 601 and 603 of FIG. 6 and will not be described again in detail.

In a step 705 (ACCESS CODE ON LEVELS i AND i+1 EXECUTE CODE ON LEVEL i), subsequent to step 703, the data and boot codes associated with isolation levels i+1 are accessible by the general-purpose processor 210 and the boot code(s) associated with isolation level i are executed.

In one example, the data or codes associated with isolation level i contain one or more encryption keys, encrypted or unencrypted, which will be used when executing one or more codes associated with isolation level i+1. Thus, a write access is for example authorized on the memory area(s) associated with the isolation level i+1 in order to provide the keys to the codes associated with the isolation level i+1.

In another example, the codes associated with isolation level i contain instructions to verify the integrity of the data and/or codes associated with isolation level i+1. Thus, read access to the memory area(s) associated with isolation level i+1 is permitted in order to perform this verification.

In a step 707 (i=i+1), subsequent to step 705, the count value is incremented. For example, the count value increases from i to i+1. In other examples, the increment increases i by several units.

In a step 709 (i=N?) the general-purpose processor 210 compares the count value i to the value N, where N is defined as described relative to step 607 in FIG. 6. If the value i is not equal to N (N branch) the method returns to step 705.

In the event that, during the comparison step 709, the count value is equal to N (Y branch), the method continues to a step 713 (EXECUTE CODE ON LEVEL N) in which the boot code(s) associated with the isolation level N are executed.

The booting of the processing device ends with a step 715 (END OF BOOT), which is similar to step 611 in FIG. 6, and is not described again in detail.

The method whose implementation is represented by FIG. 7 allows for a staggered reading of the boot codes. Indeed, the boot codes associated with an isolation level are read when the count value is lower than the isolation level value. This saves time compared to the implementation of the method shown in FIG. 6.

One advantage of the described embodiments is that the encryption keys are physically inaccessible by the unsecured general-purpose processor.

Another advantage of the described embodiments is that the selection of the encryption keys is based on a hardware implementation of a hardware monotonic counter. The encryption keys then receive additional protection because they are only accessible for a given TIL value.

Another advantage of the described embodiments is that they are easily adaptable to several boot architectures.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove. In particular, different types of processors may be used, the implementation of the selection circuit may vary as well as the number of isolation levels.

What is claimed is:

1. A method for performing a cryptographic operation, the method comprising:
   generating a first count value by a monotonic counter of a processing device;
   transmitting the first count value from the monotonic counter to a memory of the processing device;
   selecting, by a selection circuit, a first encryption key from the memory based on the first count value;
   preventing, by the selection circuit, access to any encryption keys stored in the memory that are associated with count values of the monotonic counter lower than the first count value;
   providing the selected first encryption key to a cryptographic processor;
   receiving, by a general-purpose processor of the processing device from the cryptographic processor, the first encryption key; and
   instructing, by the general-purpose processor, decryption, using the first encryption key, of encrypted data.

2. The method according to claim 1, wherein preventing access comprises preventing access to any other encryption keys that are associated with count values other than the first count value.

3. The method according to claim 1, wherein the first encryption key is selected based on the first count value and a first index.

4. The method according to claim 3, further comprising:
   selecting a second encryption key from the memory based on the first count value and a second index; and
   providing the selected second encryption key to the cryptographic processor.

5. The method according to claim 3, further comprising:
   generating a second count value by the monotonic counter of the processing device;
   transmitting the second count value from the monotonic counter to the memory of the processing device;
   selecting a second encryption key from the memory based on the second count value and the first index; and
   providing the selected second encryption key to the cryptographic processor.

6. The method according to claim 1, wherein the memory is configured such that access to the first encryption key is not permitted based on a count value greater than the first count value.

7. The method according to claim 1, wherein, making the first encryption key available to the cryptographic processor is performed, based on a storage condition of the first encryption key, via a bus between the memory and the cryptographic processor, or via a register readable by the general-purpose processor of the processing device.

8. The method according to claim 7, wherein the storage condition is that the first encryption key is stored in a first address range.

9. The method according to claim 7, wherein the storage condition is that the first encryption key is stored in the memory in association with a first value of a flag.

10. The method according to claim 7, wherein the bus is dedicated to transmitting encryption keys between the memory and the cryptographic processor.

11. The method according to claim 1, wherein the monotonic counter is initialized to the first count value upon a first boot of the processing device, the method further comprising initializing the monotonic counter to a second count value upon a second boot of the processing device.

12. The method according to claim 11, further comprising initializing the monotonic counter to the first count value if a device state condition is satisfied upon a third boot of the processing device.

13. The method according to claim 12, wherein the device state condition corresponds to a programming state of an area of the memory.

14. A method for performing a cryptographic operation, the method comprising:
   generating a first count value by a monotonic counter of a processing device;
   transmitting the first count value from the monotonic counter to a memory of the processing device;
   selecting a first encryption key from the memory based on the first count value and a first index;
   providing the selected first encryption key to a cryptographic processor;
   receiving, by a general-purpose processor of the processing device from the cryptographic processor, the first encryption key;
   instructing, by the general-purpose processor, decryption, using the first encryption key, of first encrypted data;
   selecting a second encryption key from the memory based on the first count value and a second index;
   providing the selected second encryption key to the cryptographic processor;
   receiving, by the general-purpose processor from the cryptographic processor, the second encryption key;
   instructing, by the general-purpose processor, decryption, using the second encryption key, of second encrypted data;
   generating a second count value, greater than the first count value, by the monotonic counter of the processing device;
   transmitting the second count value from the monotonic counter to the memory of the processing device;
   selecting, by a selection circuit, a third encryption key from the memory based on the second count value and the first index;
   preventing, by the selection circuit, access to the first and second encryption keys associated with the first count value;
   providing the selected second encryption key to the cryptographic processor;
   receiving, by the general-purpose processor from the cryptographic processor, the third encryption key; and
   instructing, by the general-purpose processor, decryption, using the third encryption key, of third encrypted data.

15. The method of claim 14, wherein the monotonic counter is initialized to the first count value upon a first boot of the processing device, the method further comprising initializing the monotonic counter to the second count value upon a second boot of the processing device.

16. The method of claim 15, further comprising initializing the monotonic counter to the first count value if a device state condition is satisfied upon a third boot of the processing device.

17. A data processing device comprising:
   a monotonic counter configured to generate a first count value;
   a first memory comprising a selection circuit, the selection circuit configured to:
      select an encryption key stored in the first memory based on the first count value, prevent access to any encryption keys stored in the first memory that are associated with count values of the monotonic counter lower than the first count value; and provide the selected encryption key to a cryptographic processor; and a general-purpose processor configured to:
receive the encryption key from the cryptographic processor, and
instruct decryption, using the encryption key, of encrypted data.

18. The data processing device of claim 17, wherein the first memory further comprises:
a first memory area associated with a first isolation level, the encryption key being stored in the first memory area,
a second memory area separate from the first memory area and associated with a second isolation level, and
a multiplexer comprising a first input connected to the first memory area, a second input connected to the second memory area, a control input connected to the monotonic counter and configured to receive the first count value, and an output coupled to the cryptographic processor.

19. The data processing device of claim 17, further comprising:
a first bus connected between the cryptographic processor and the first memory, the first bus being dedicated to transmitting encryption keys between the first memory and the cryptographic processor.

20. The data processing device of claim 19, further comprising:
a second memory coupled to the general-purpose processor and configured to store the encrypted data; and
a second bus connecting the general-purpose processor, the first memory, the second memory, and the cryptographic processor.

* * * * *